(12) United States Patent
Gaur et al.

(10) Patent No.: US 10,839,153 B2
(45) Date of Patent: Nov. 17, 2020

(54) UNCONSCIOUS BIAS DETECTION

(71) Applicant: Microsoft Technology Licensing, LLC, Redmond, WA (US)

(72) Inventors: Naveen Gaur, Bellevue, WA (US); Priyanka Subhash Kulkarni, Bellevue, WA (US); Erika Debra Menezes, Redmond, WA (US); Wenlei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 15/604,549

(22) Filed: May 24, 2017

(65) Prior Publication Data
US 2018/0341637 A1  Nov. 29, 2018

(51) Int. Cl.
*G06F 40/253* (2020.01)
*G06F 40/211* (2020.01)
*G06F 40/289* (2020.01)
*G06F 40/35* (2020.01)

(52) U.S. Cl.
CPC .......... *G06F 40/253* (2020.01); *G06F 40/211* (2020.01); *G06F 40/289* (2020.01); *G06F 40/35* (2020.01)

(58) Field of Classification Search
CPC ..... H04L 51/12; G06F 17/271; G06F 17/274; G06F 17/279; G06F 17/2775; G06F 40/211; G06F 40/253; G06F 40/289; G06F 40/35
USPC ........................................................ 704/1, 9
See application file for complete search history.

(56) References Cited

U.S. PATENT DOCUMENTS

| | | | |
|---|---|---|---|
| 4,674,065 A | 6/1987 | Lange et al. | |
| 4,833,610 A * | 5/1989 | Zamora | G06F 40/247 |
| 5,467,448 A * | 11/1995 | Hilton | G06F 17/211 |
| | | | 715/235 |
| 6,075,550 A * | 6/2000 | Lapierre | H04N 7/0885 |
| | | | 348/465 |
| 6,367,064 B1 * | 4/2002 | Brown | G06F 17/5022 |
| | | | 716/106 |
| 9,405,741 B1 * | 8/2016 | Schaaf | G10L 15/08 |
| 10,127,212 B1 * | 11/2018 | Kim | G06F 17/24 |
| 2002/0199166 A1 * | 12/2002 | Volcani | G06F 40/247 |
| | | | 717/100 |
| 2003/0212655 A1 * | 11/2003 | Volcani | G06F 16/30 |
| 2004/0024760 A1 | 2/2004 | Toner et al. | |
| 2004/0181759 A1 | 9/2004 | Murakami et al. | |
| 2006/0155728 A1 * | 7/2006 | Bosarge | G06F 16/955 |
| 2007/0282811 A1 * | 12/2007 | Musgrove | G06F 16/951 |
| 2008/0109210 A1 | 5/2008 | Skuratovsky | |
| 2009/0012965 A1 * | 1/2009 | Franken | G06Q 10/10 |
| 2009/0148073 A1 * | 6/2009 | Jenkins | G06F 17/24 |
| | | | 382/311 |

(Continued)

OTHER PUBLICATIONS

Bretschneider, et al. "Detecting online harassment in social networks." Thirty Fifth International Conference on Information Systems, Auckland, Dec. 2014, pp. 1-14. (Year: 2014).*

(Continued)

*Primary Examiner* — James S Wozniak
(74) *Attorney, Agent, or Firm* — Rainier Patents, P.S.

(57) ABSTRACT

The discussion relates to unconscious bias detection. One example can detect potential bias words in a text sample and suggest alternative phrasing to eliminate the potential bias words from the text sample.

20 Claims, 16 Drawing Sheets

(56) References Cited

U.S. PATENT DOCUMENTS

| | | | |
|---|---|---|---|
| 2009/0177750 A1* | 7/2009 | Lee | G06Q 10/107 709/206 |
| 2010/0082657 A1* | 4/2010 | Paparizos | G06F 16/374 707/767 |
| 2010/0275118 A1 | 10/2010 | Iakobashvili et al. | |
| 2011/0077950 A1* | 3/2011 | Hughston | G06Q 40/08 705/1.1 |
| 2011/0191097 A1* | 8/2011 | Spears | G06F 16/9535 704/9 |
| 2011/0191105 A1* | 8/2011 | Spears | G06F 16/9535 704/251 |
| 2011/0208522 A1* | 8/2011 | Pereg | G06F 17/279 704/235 |
| 2012/0246133 A1* | 9/2012 | Hsu | G06F 17/276 707/706 |
| 2012/0296634 A1* | 11/2012 | Revesz | H04L 51/12 704/9 |
| 2014/0068425 A1* | 3/2014 | Potnis | G06F 17/248 715/255 |
| 2014/0255004 A1* | 9/2014 | Allen | H04N 21/4756 386/241 |
| 2014/0365448 A1* | 12/2014 | Keller | G06F 16/3322 707/692 |
| 2015/0104766 A1* | 4/2015 | Vuong | G06F 3/0481 434/169 |
| 2015/0309987 A1* | 10/2015 | Epstein | G06F 17/2765 704/9 |
| 2015/0334067 A1* | 11/2015 | Zonka | H04L 67/36 715/752 |
| 2016/0048488 A1* | 2/2016 | Cook | G06F 16/334 715/257 |
| 2016/0055457 A1 | 2/2016 | Mather et al. | |
| 2016/0147731 A1* | 5/2016 | Parikh | G06F 17/276 715/261 |
| 2016/0294755 A1* | 10/2016 | Prabhu | H04L 51/12 |
| 2017/0041263 A1* | 2/2017 | Shekel | H04L 51/12 |
| 2017/0084273 A1* | 3/2017 | Zohar | G10L 15/22 |
| 2017/0220536 A1* | 8/2017 | Chiba | G06F 17/24 |
| 2017/0257329 A1* | 9/2017 | Tetreault | H04L 51/046 |
| 2018/0089164 A1* | 3/2018 | Iida | G06F 17/274 |
| 2019/0148002 A1* | 5/2019 | Nunes | G06F 19/3481 |

OTHER PUBLICATIONS

Chen, Ying, et al. "Detecting offensive language in social media to protect adolescent online safety." Privacy, Security, Risk and Trust (PASSAT), 2012 International Conference on and 2012 International Confernece on Social Computing (SocialCom). IEEE, Sep. 2012, pp. 1-10. (Year: 2012).*

Kuang, Sicong, et al. "Semantic and context-aware linguistic model for bias detection." Proc. of the Natural Language Processing meets Journalism IJCAI-16 Workshop. Jul. 2016, pp. 57-62. (Year: 2016).*

Xiang, Guang, et al. "Detecting offensive tweets via topical feature discovery over a large scale twitter corpus." Proceedings of the 21st ACM international conference on Information and knowledge management. ACM, Oct. 2012, pp. 1980-1984. (Year: 2012).*

Weber, Jean. "Gender Neutral Technical Writing." retrieved from https://techwhirl.com/gender-neutraltechnical-writing/, Jan. 2012, pp. 1-8. (Year: 2012).*

Herdağdelen, Amaç. "Twitter n-gram corpus with demographic metadata." Language resources and evaluation 47.4, Dec. 2013, pp. 1127-1147. (Year: 2013).*

Leavy, Susan. Detecting Gender Bias in the Coverage of Politicians in Irish Newspapers Using Automated Text Classification. Diss. Trinity College Dublin, Apr. 2014, pp. 1-287. (Year: 2014).*

Le Nagard, Ronan, and Philipp Koehn. "Aiding pronoun translation with co-reference resolution." Proceedings of the Joint Fifth Workshop on Statistical Machine Translation and MetricsMATR. Jul. 2010, pp. 252-261. (Year: 2010).*

Anonymous, "Avoiding Gender-Biased Language." Retrieved from https://cdn.vanderbilt.edu/vu-wp0/wp-content/uploads/sites/164/2019/03/28042529/Avoiding-Gender-Biased-Language.pdf, Jul. 2008, p. 1. (Year: 2008).*

Recasens, et al., "Linguistic Models for Analyzing and Detecting Biased Language", In Proceedings of the 51st Annual Meeting of the Association for Computational Linguistics, vol. 1, Aug. 2013, 10 Pages.

Peck, Emily, "Here Are the Words That May Keep Women From Applying for Jobs", Retrieved From <<http://www.huffingtonpost.in/entry/textio-unitive-bias-software_n_7493624>>, Mar. 6, 2015, 8 Pages.

Warren, Virginia L., "APA Guidelines for Non-Sexist Use of Language", Retrieved From <<http://www.apaonlinecsw.org/apa-guidelines-for-non-sexist-use-of-language>>, Retrieved on: Mar. 24, 2017, 5 Pages.

Driscoll, et al., "Stereotypes and Biased Language", Retrieved From <<https://owl.english.purdue.edu/owl/resource/608/05/>>, Jul. 13, 2010, 3 Pages.

"Guidelines for Gender-Fair Use of Language", Retrieved From <<http://www.ncte.org/positions/statements/genderfairuseoflang>>, Retrieved on: Mar. 24, 2017, 8 Pages.

Stilman, Anne, "Grammatically Correct", In Publication of Writer's Digest Books, Sep. 15, 1997, 338 Pages.

Driscoll, et al., "Appropriate Pronoun Usage", Retrieved From <<https://owl.english.purdue.edu/owl/resource/608/06/>>, Feb. 25, 2013, 2 Pages.

Warren, Virginia L., "Guidelines for Non-Sexist Use of Language", Retrieved From <<http://www.apaonline.org/?page=nonsexist>>, Retrieved on: Mar. 24, 2017, 11 Pages.

Bergsma, Shane, "Noun Gender and Number Data for Coreference Resolution", Retrieved From <<http://www.clsp.hu.edu/~sbergsma/Gender/index.html>>, May 11, 2006, 3 Pages.

Gannes, Liz, "Textio Spell Checks for Gender Bias", Retrieved From >>http://www.recode.net/2015/4/20/11561646/textio-spell-checks-for-gender-bias>>, Apr. 20, 2015, 6 Pages.

* cited by examiner

SCREENSHOT 100C

Word processing app 102
Proofing — 106

TEXT 104:
Our latest project is behind schedule so we need to hire another programmer. He better be good because we have a lot of work to do. Hopefully, this hire will give us the manpower we need to get back on schedule. ← 114(1), 114(2)

Last month we hired John Smith as our new developer. He previously worked in academia. John is taking the lead on long-term product development.

— 116

| Detected potential unconscious bias words | Suggested alternative language |
|---|---|
| Reconsider usage of 'he' at 'he better be good' | -Reconsider usage of 'he' at 'he better be'<br>+Possible action: Replace with gender neutral pronoun 'he/she'<br>+Possible action: Replace with gender neutral pronoun 'they'<br>+Possible action: Replace with 'the selected candidate' ← 120 |
| Reconsider usage of 'manpower' at 'the manpower we need' | -Reconsider usage of 'manpower' at 'the manpower we need'<br>+Possible action: Replace with gender neutral term 'staff'<br>+Possible action: Replace with gender neutral pronoun 'workforce' |

— 118

[Save] [Export] [Close]

FIG. 1C

SCREENSHOT 100D

Word processing app 102

Proofing — 106

TEXT 104:
Our latest project is behind schedule so we need to hire another programmer. The selected candidate better be good because we have a lot of work to do. Hopefully, this hire will give us the manpower we need to get back on schedule.

Last month we hired John Smith as our new developer. He previously worked in academia. John is taking the lead on long-term product development.

— 116

Detected potential unconscious bias words | Suggested alternative language
— 118

Reconsider usage of 'he' at 'he better be' 
— 122
- Reconsider usage of 'he' at 'he better be'
+ Possible action: Replace with gender neutral pronoun 'he/she'
+ Possible action: Replace with gender neutral pronoun 'they'
+ Possible action: Replace with 'the selected candidate' — 124

Reconsider usage of 'manpower' at 'the manpower we need'
- Reconsider usage of 'manpower' at 'the manpower we need'
+ Possible action: Replace with gender neutral term 'staff' — 126
+ Possible action: Replace with gender neutral pronoun 'workforce'

[Save] [Export] [Close]

FIG. 1D

UNCONSCIOUS BIAS DETECTION

BACKGROUND

People tend to have unconscious bias in their writing styles. This bias tends to be so ingrained that it often goes unnoticed by the writer.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the figure and associated discussion where the reference number is first introduced.

FIGS. 1A-1D show screenshots of a graphical user interface (GUI) relating to unconscious bias detection in accordance with some implementations of the present concepts.

DETAILED DESCRIPTION

The present concepts relate to unconscious or unintended bias. People (e.g., users) tend to have unconscious bias in their writing styles. This unconscious bias tends to be so ingrained that it often goes unnoticed by the user. The present concepts can detect instances of unconscious bias and bring it to the user's attention. Alternative suggestions can also be presented to the user to avoid the unconscious bias.

Research indicates that all people have an unconscious bias influenced by background, cultural environment, and/or personal experiences. This unconscious bias tends to be reflected in a user's writing and other activities without the user even realizing it. Avoiding unconscious bias in writing is important for many reasons. For instance, the writer wants to avoid offending his/her readers or making them feel excluded, which could compromise the writer's credibility.

FIGS. 1A-1D collectively show a set of screenshots 100A, 100B, 100C, and 100D of a graphical user interface (GUI) 101. The screenshots could be captured from various types of devices, such as smartphones, tablets, notebook computers, desktop computers, etc. Example devices are described in more detail below relative to FIG. 9. Further, in this case, the screenshots relate to a word processing application (app) 102, but could relate to any type of application, web service, and/or user interface where the user generates text. The text includes words arranged as phrases and/or sentences. For instance, text is utilized in email, tweets, texts, posts, blogs, articles, memoranda, documents, etc. Stated another way, the present concepts can be manifest as an unconscious bias detection service that can be applied to text from any source.

Figure 1A:
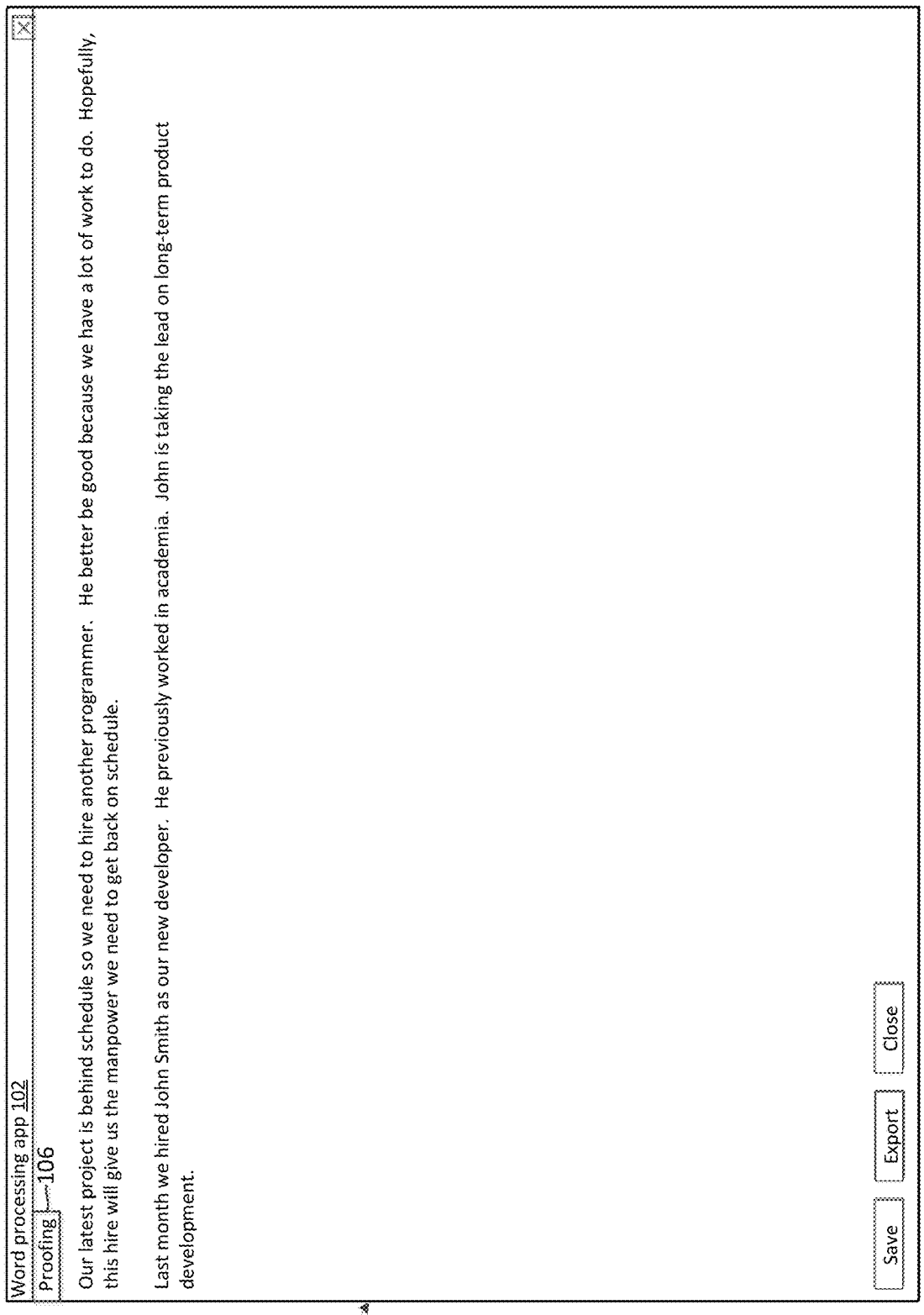

FIG. 1A shows screenshot 100A where the user has entered text or text sample 104. The user can employ the unconscious bias detection service on the text. In this case, the unconscious bias detection service can be employed via a proofing tab 106. For purposes of explanation, assume that the user selects the proofing tab 106.

Figure 1B:
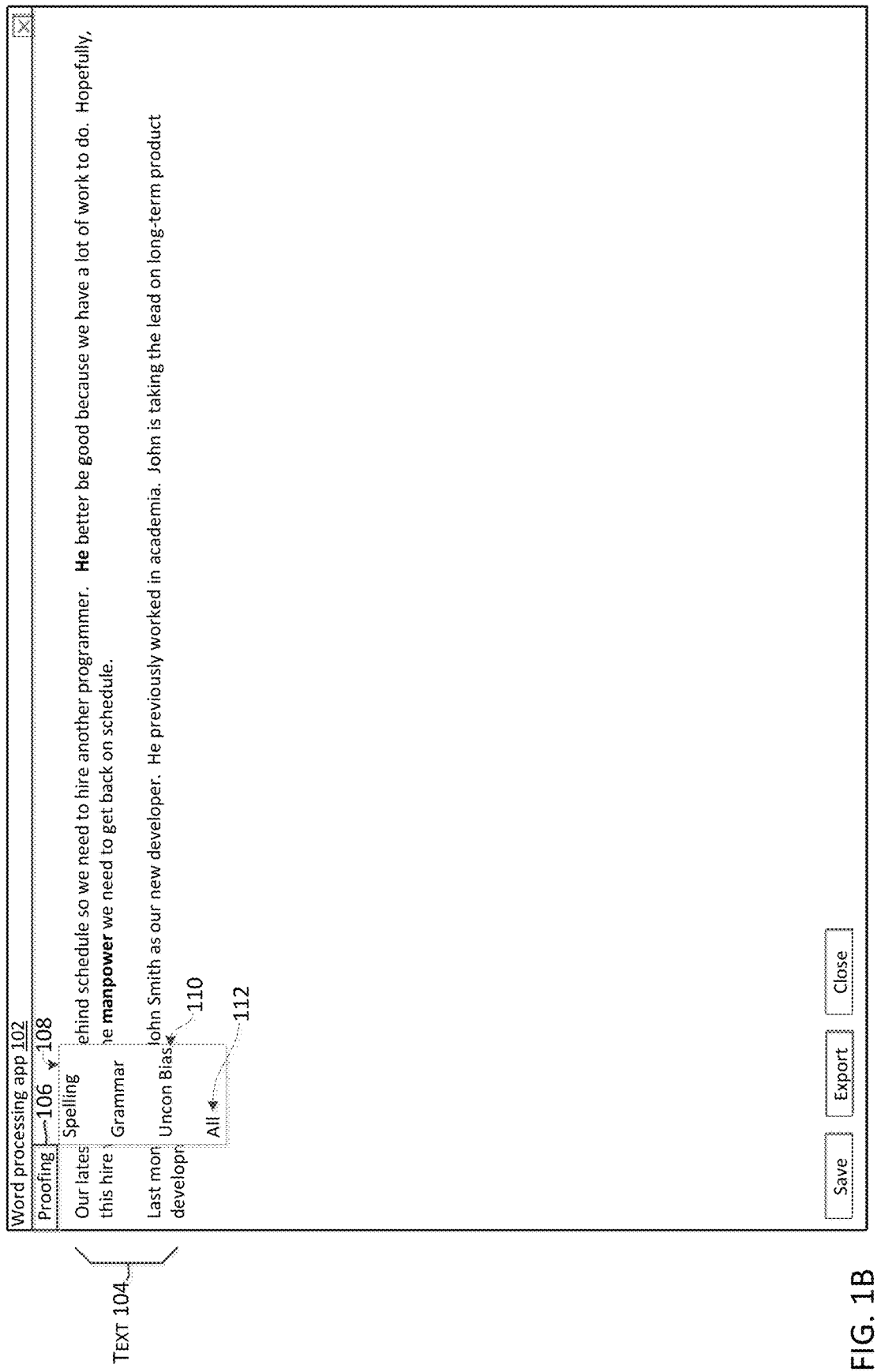

FIG. 1B shows a subsequent screenshot 100B that shows a dropdown menu of proofing options at 108. This screenshot shows that the user can employ the unconscious bias detection service by selecting unconscious bias detection alone (at 110) and/or in combination with other proofing services (at 112). Assume for purposes of explanation that the user selected unconscious bias detection 110. Other techniques for launching the unconscious bias detection service can be employed. For example, the user may utter an audible command to run the unconscious bias detection service. Alternatively, the user could select user settings that cause the unconscious bias detection service to be run automatically before text is shared, sent, and/or otherwise disseminated.

FIG. 1C shows a subsequent screenshot 100C with unconscious bias detection employed responsive to the user selection of FIG. 1B. Screenshot 100C shows instances of potential unconscious bias words (e.g., unconscious bias candidates) highlighted in bold at 114(1) and 114(2). In this case, the highlighted potential unconscious bias words include the word "he" at 114(1) and the word "manpower" at 114(2). Screenshot 100C also includes a listing of the detected potential unconscious bias words at 116 and a suggested alternative language listing at 118.

The listing of detected potential unconscious bias words 116 recites "reconsider usage of 'he' in the context of (e.g., at) 'he better be good.'" It also recites "reconsider usage of 'manpower' in the context of (e.g., at) 'the manpower we need.'" Thus, the listing of detected potential unconscious bias words 116 can provide a convenient listing of questionable language for the user to review. Note also, that in this implementation the unconscious bias detection service can provide a smart analysis of the text 104 to distinguish instances where a word is used without unconscious bias from instances where the word is biased. For instance, in this example, the word "he" in the phrase "he better be good" is highlighted for potential unconscious bias because there is no basis for the use of the masculine word "he." Instead, the usage is based on an unconscious bias that the programmer will be a male. In contrast, the word "he" in the phrase 'he previously worked in academia' is not biased since the word "he" refers back to "John Smith" in the previous sentence. Thus, words can be evaluated for unconscious bias at least in part on their relationship to other terms in the text.

The listing of suggested alternative language 118 can include entries from the listing of detected potential unconscious bias words 116 and can further provide non-biased alternative language. For instance, in regard to the use of the term "he," three alternative language suggestions are provided. The alternative language suggestions include "he/she," "they," and "the selected candidate." In this example, the alternative suggestions can replace the biased pronoun with an unbiased pronoun or a noun. In regard to the use of the term "manpower," the alternative language suggestions include the terms "staff" and "workforce."

For purposes of explanation, relative to FIG. 1C assume that the user selects at 120 the phrase "the selected candidate" to replace the term "he."

FIG. 1D shows a subsequent screenshot 100D where the user selection of "the selected candidate" has replaced the biased term "he" at 122. This replacement is also indicated with underlining at 124 in the suggested alternative language 118. In relation to the biased term "manpower," the user is now selecting the suggested alternative term "staff" with the cursor at 126. This selection can automatically replace "manpower" in the text 104. Thus, the present concepts solve the technical problem of evaluating user generated text to identify unconscious bias and providing options for the user to replace the biased text with non-biased text.

Figure 2:
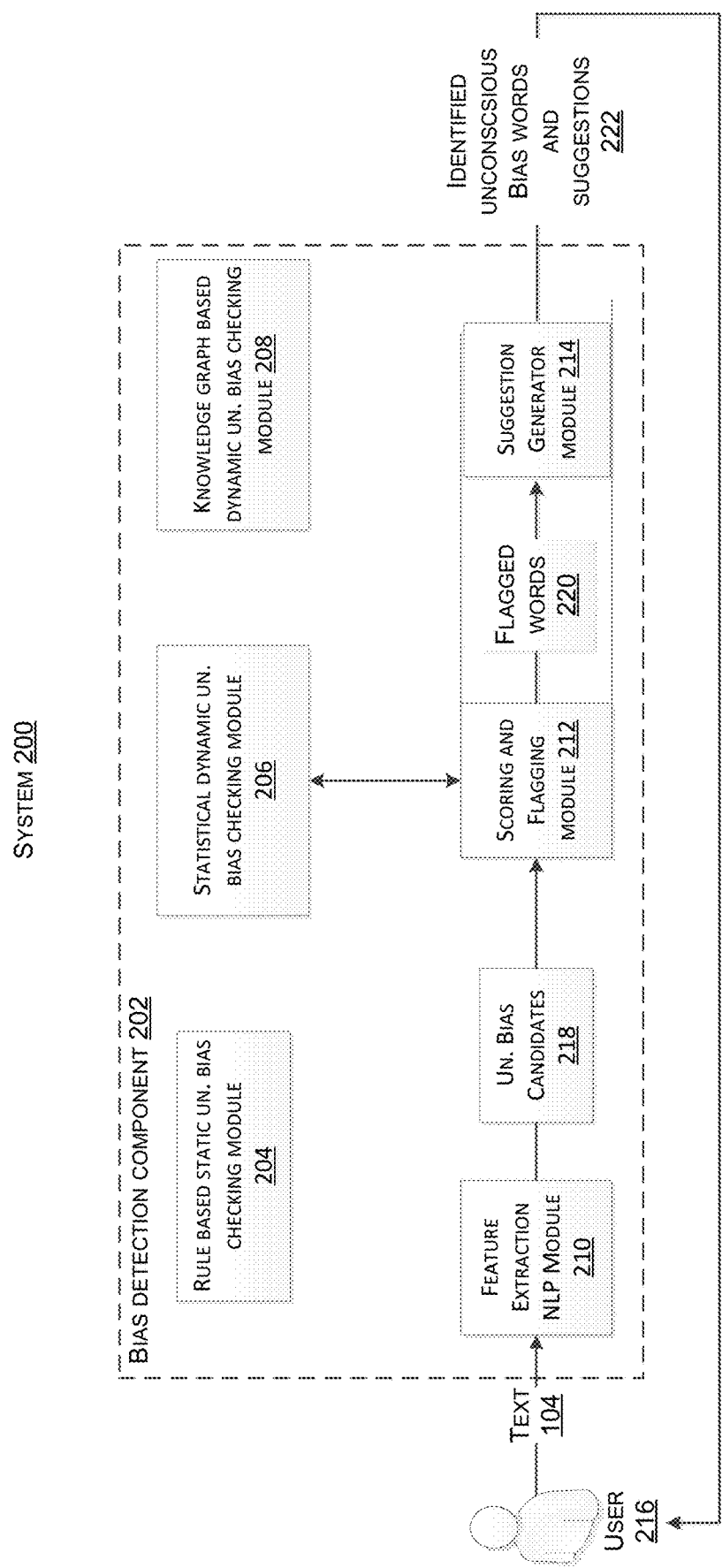
FIGS. 2 and 9 show example systems that can implement unconscious bias detection concepts in accordance with some implementations.

FIG. 2 shows a system 200 that can implement the unconscious bias detection service introduced above. In this case, the system includes an unconscious bias detection component 202. The unconscious bias detection component can include a rule based static unconscious bias checking module 204, a statistical dynamic unconscious bias checking module 206, a knowledge graph based dynamic unconscious bias checking module 208, a feature extraction natural language processing (NLP) module 210, a scoring and flagging module 212, and/or a suggestion generator module 214. An example feature extraction natural language processing module 210 is discussed in more detail below relative to FIG. 3. An example rule based static unconscious bias checking module 204 is described below relative to FIG. 4. An example statistical dynamic unconscious bias checking module 206 is described below relative to FIG. 5. An example knowledge graph based dynamic unconscious bias checking module 208 is described below relative to FIG. 6. An example scoring and flagging module 212 is described below relative to FIG. 7. An example suggestion generator module 214 is described below relative to FIG. 8.

In operation, a user 216 can generate text 104. The feature extraction natural language processing module 210 can analyze the text 104 to produce unconscious bias candidates (e.g., potentially biased words) 218. The unconscious bias candidates can be processed by the scoring and flagging module 212 to produce flagged words 220 (e.g., highlighted potential unconscious bias words 114 of FIG. 1C). The flagged words can be supplied to the suggestion generator module 214. The suggestion generator module can produce the identified unconscious bias words and suggestions 222 (e.g., suggested alternative language 118 of FIG. 1C). The identified unconscious bias words and suggestions can be presented to the user 216.

Figure 3:
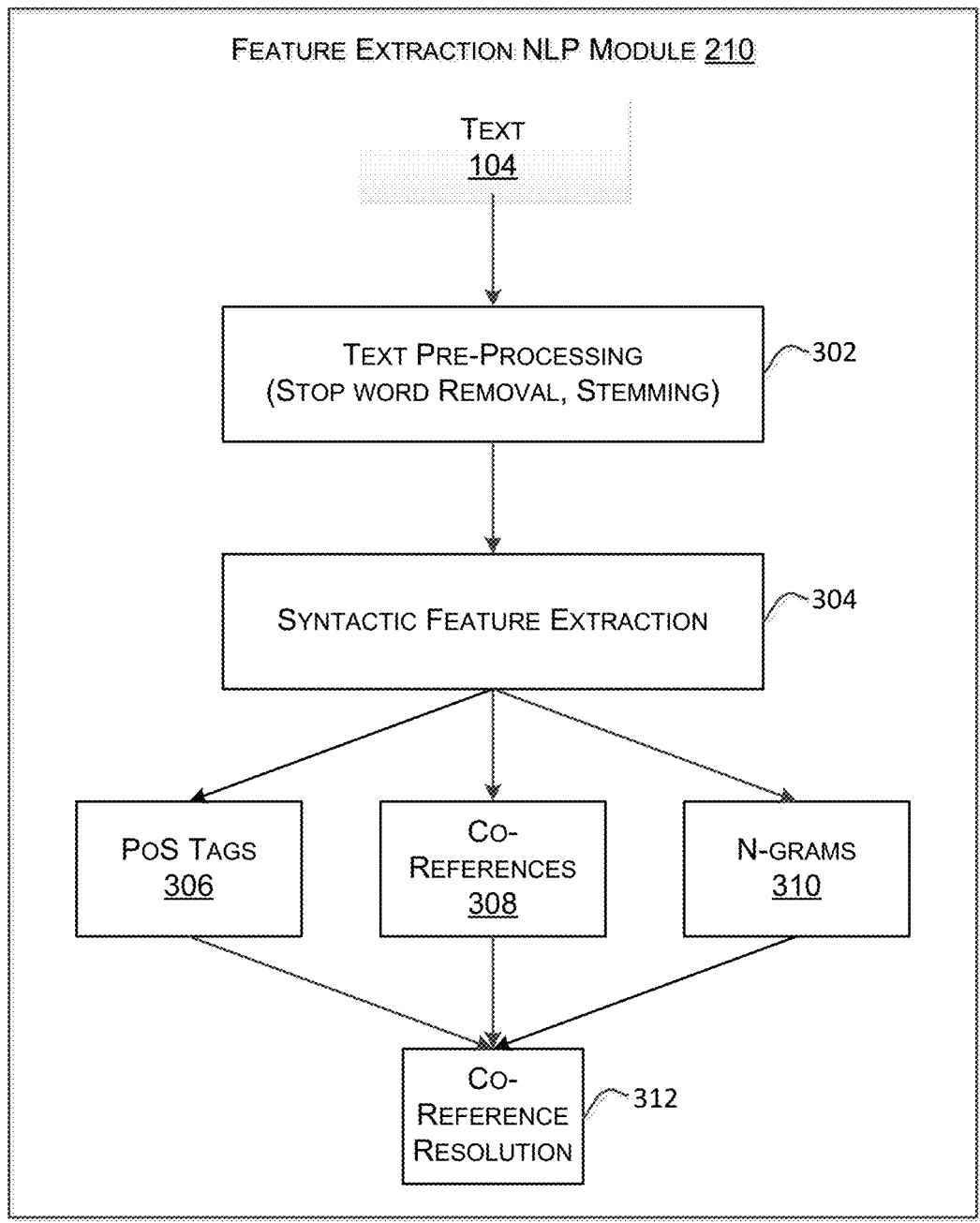
FIGS. 3-8 show detailed views of components of the system of FIG. 2 in accordance with some implementations of the present concepts.

FIG. 3 shows an example feature extraction natural language processing module 210. The text 104 can be received and text preprocessing can be performed at 302. For instance, some classes of words (e.g., 'stop words') that do not contain important information can be removed. For instance, articles and prepositions can be removed. Other classes of words can be simplified (e.g., sometimes referred to as "stemming"). For instance, verbs can be simplified to their root form. For example, "running" and "ran" can be simplified to "run". Syntactic feature extraction 304 can be performed on the preprocessed text. Syntactic feature extraction 304 can entail multiple types of analysis to identify part-of-speech (POS) tags 306, co-references 308, and/or N-grams 310.

POS tags 306 can assign parts of speech to each word such as noun, verb, adjective, etc. The co-references 308 can give the relation between pro-forms (pronouns, pro-verbs, pro-adjectives) and the expression it refers to. For instance, in the text, "David is going to the meeting. He will be late," the pro-forms indicate=>He->David (e.g., he refers back to the prior instance of David). N-grams 310 can relate to unigrams, bi-grams, and trigrams for all words in the input text.

The feature extraction NLP module 210 can achieve co-reference resolution at 312. The co-reference resolution can be achieved using the POS tags 306 and the co-references 308 to deduce which pronouns do not have any expression associated with it, thus implying a gender bias. (See the example involving the word "he" relative to FIGS. 1A-1D). If an instance of unconscious bias is detected, the word can then be added to the list of unconscious bias candidates (218, FIG. 2).

Figure 4:
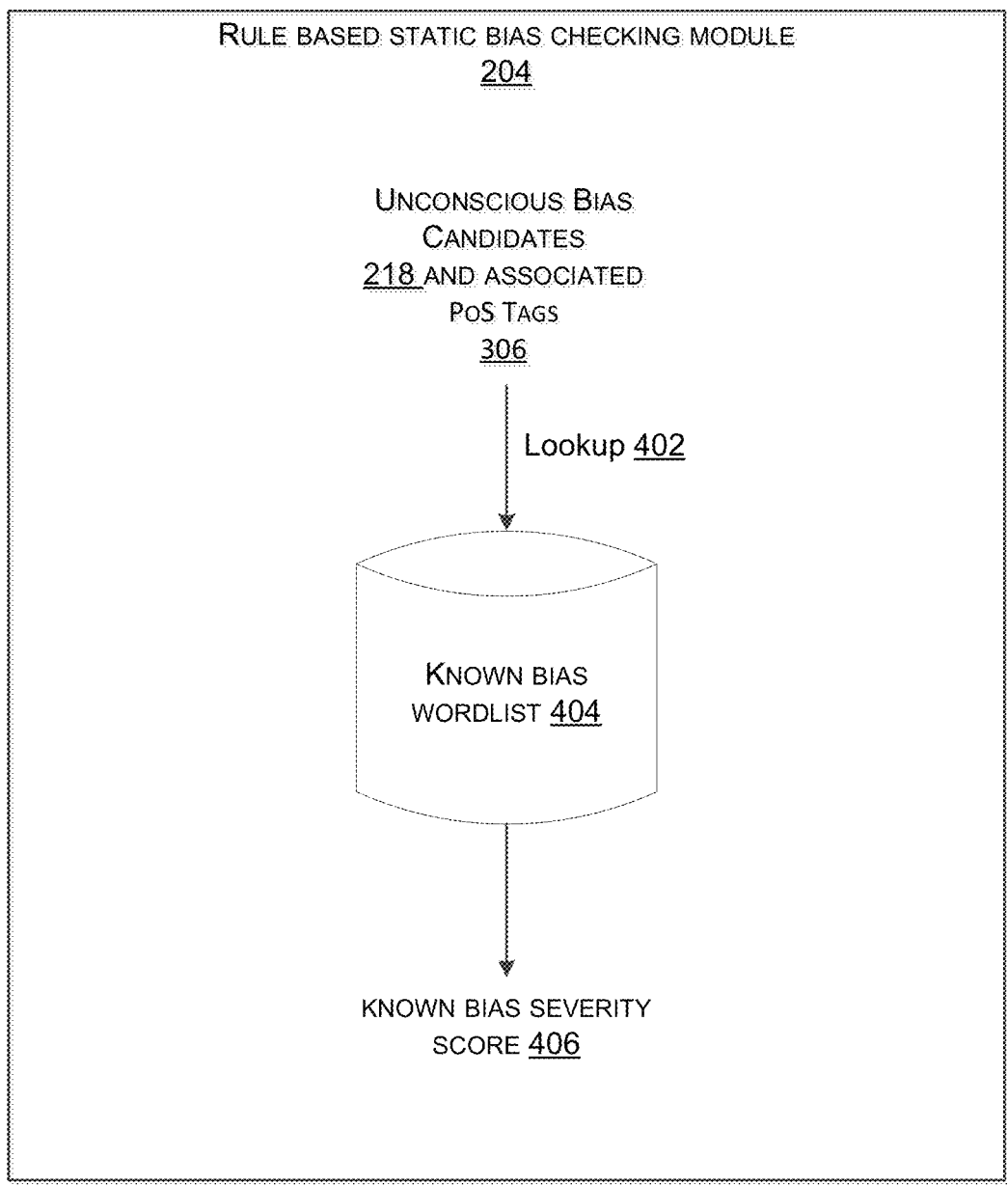

FIG. 4 shows an example rule based static unconscious bias checking module 204. The rule based static unconscious bias checking module can receive the unconscious bias candidates 218 and associated POS tags 306. The rule based static unconscious bias checking module can perform a lookup 402 against a known bias word list 404. The known bias word list can include a listing of bias indicating words, POS tags, and associated severity. This known bias wordlist is a static word list generated by linguistic research, corporate policies, etc. For example, racially profane words would have a high bias severity associated with them in the known bias word list. For every request from the scoring and flagging module (212, FIG. 2), the rule based static unconscious bias checking module can generate a known bias severity score 406 for each incoming unconscious bias candidate (word, POS tag).

Figure 5:
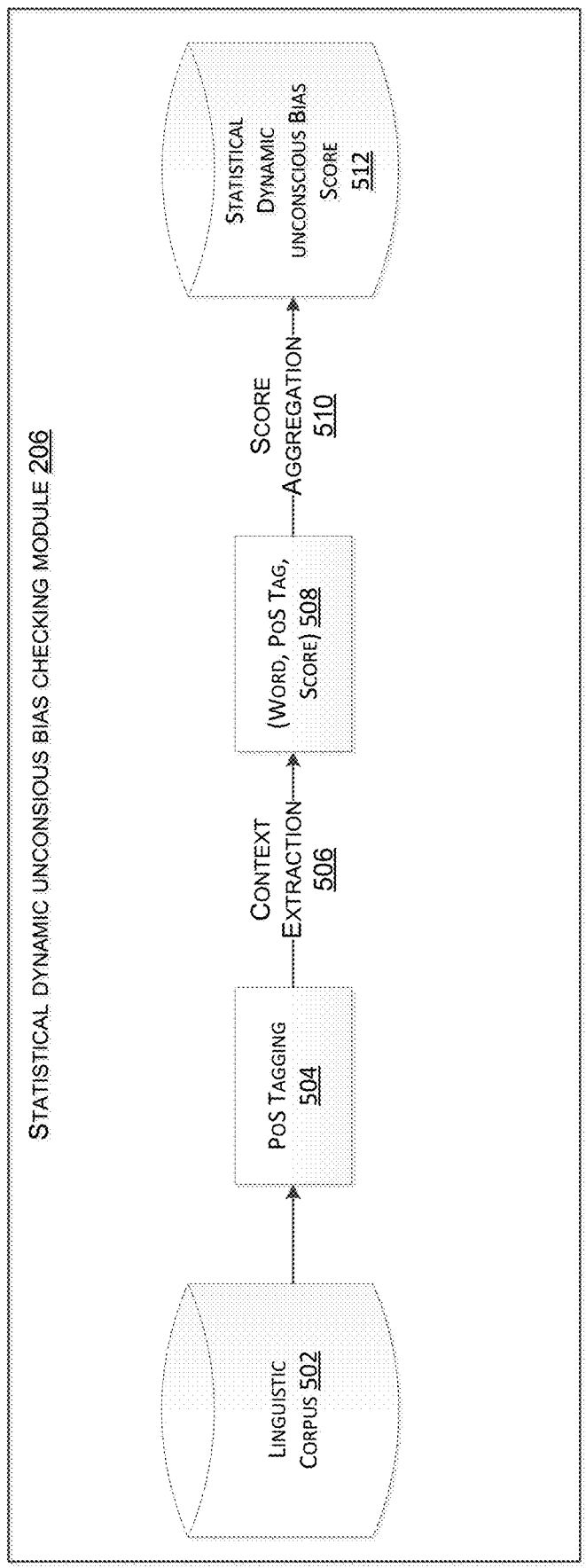

FIG. 5 shows an example statistical dynamic unconscious bias checking module 206. The statistical dynamic unconscious bias checking module can employ a linguistic corpus 502. The linguistic corpus can be updated periodically and/or from time to time to reflect recent developments, such as new slang words and/or word usages. The statistical dynamic unconscious bias checking module can utilize the linguistic corpus 502 to perform POS tagging 504 to achieve context extraction 506. This processing can provide individual words (from the unconscious bias candidates 218, FIG. 2) with POS tags and bias scores at 508. A score aggregation 510 can be utilized with a statistical dynamic unconscious bias score 512.

Figure 6:
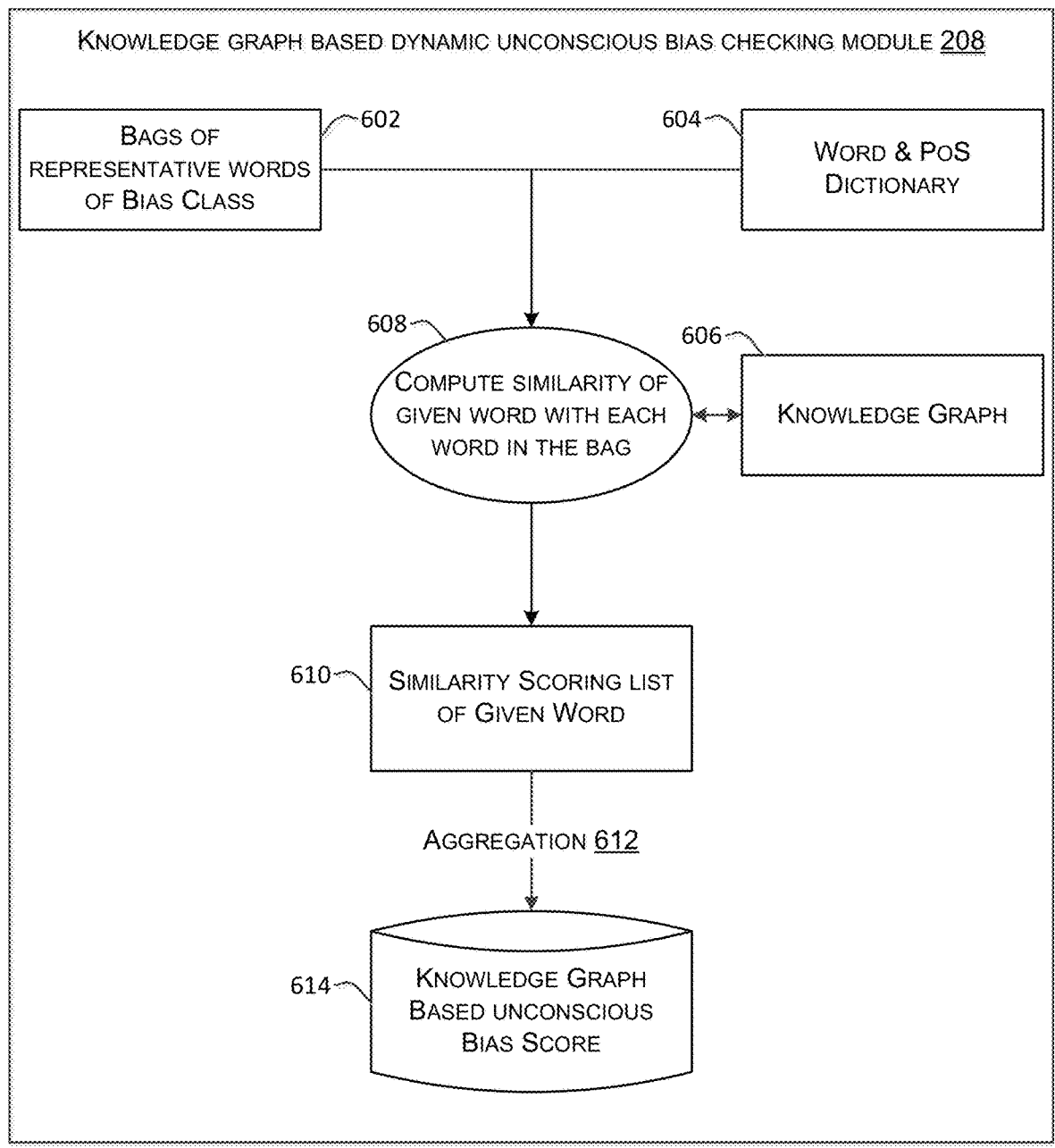

FIG. 6 shows an example knowledge graph based dynamic unconscious bias checking module 208. The knowledge graph based dynamic unconscious bias checking module can employ bags of representative words of bias class 602, word and POS dictionary 604, and knowledge graph 606 to compute a similarity of a given word with each word in the bag at 608. An example bag of words for the male bias class might include words such as: male, man, men, boy, dude, masculine, manlike, macho, manly, stag, gentleman, guy, gent, son, sir, mister, king, brother, groom, husband, nephew, and prince, among others. An example bag of words for the female bias class might include words such as: female, woman, women, girl, feminine, girlish, hen, daughter, madam, miss, lady, queen, sister, bride, wife, niece, and princess, among others.

These computed similarities 608 can be used to generate a collective similarity scoring list of a given word at 610. Aggregation can be performed at 612 to produce a knowledge graph based unconscious bias score 614. Examples of available knowledge graphs can include Word2vec, GloVe, Microsoft Bing's Satori Knowledge Base, Yandex's Object Answer, and/or LinkedIn's Knowledge Graph.

Figure 7:
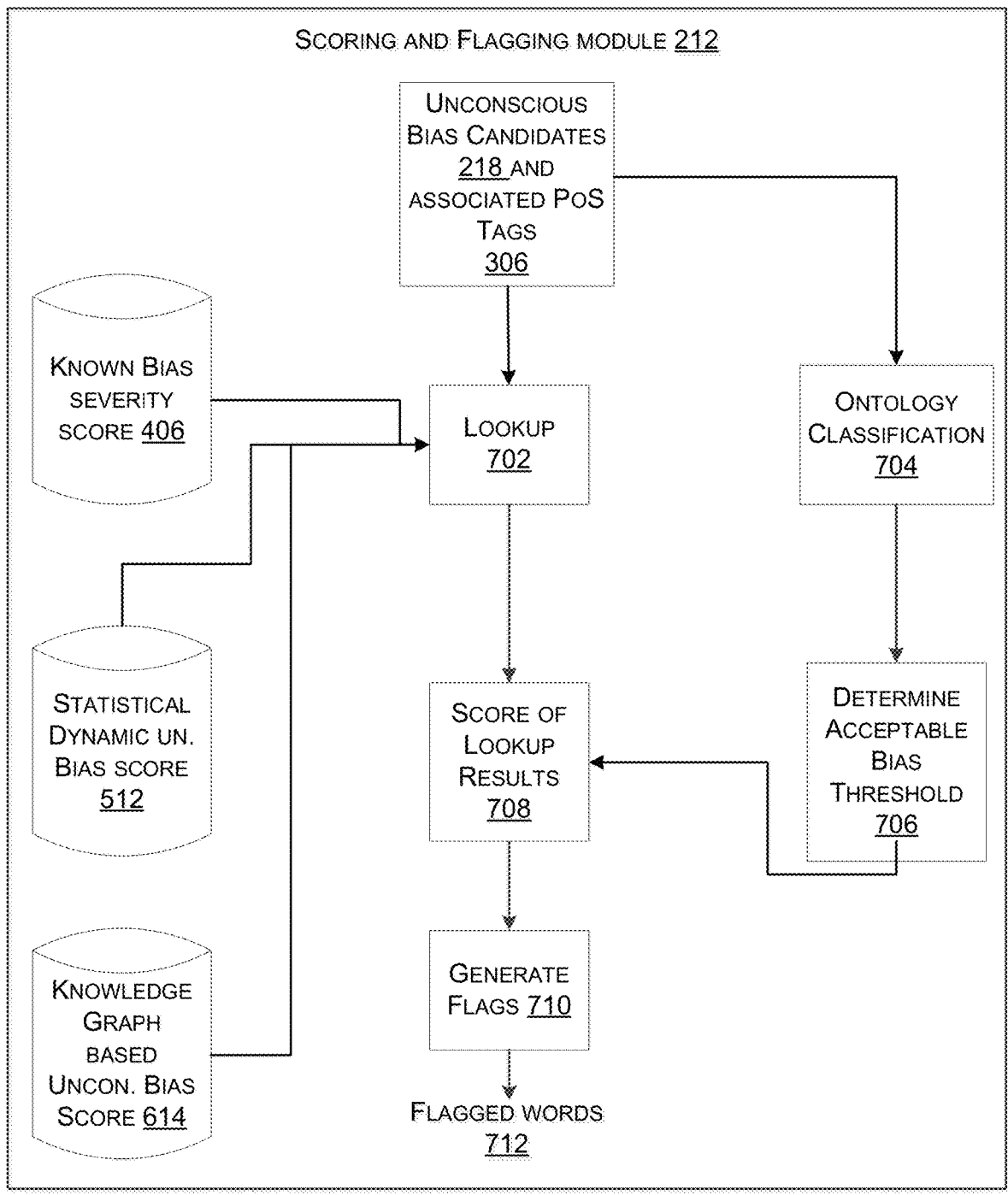

FIG. 7 shows an example scoring and flagging module 212. The scoring and flagging module can take unconscious bias candidates 218 and associated POS tags 306 (e.g., <Word, PosTag(context)>) as input. For each of these inputs, the scoring and flagging module 212 can look up values at 702 to obtain known bias severity scores 406 (from FIG. 4), statistical dynamic unconscious bias scores 512 (from FIG. 5), and/or knowledge graph based unconscious bias scores 614 (from FIG. 6).

For each word and context, scoring and flagging module 212 can also determine the ontology classification at 704 and determine an acceptable bias threshold at 706 for that class. An example ontology classification 704 for the word 'soldier' is provided for the purposes of explanation. In this example the ontology classification 704 can be: Thing=>Agent=>Organization=>Military=>service=>armed_force=>personnel. Historical text tends to be more biased towards male gender for this ontology group. Hence, even when "soldier" will look like a biased word it is not as the threshold for this class for biasness will be more than for other neutral classifications.

The acceptable bias threshold 706 can depend upon which class the word belongs to, as some word classes would be more biased than others. Historically, some categories of word were more likely to be associated with a particular bias class than others. Hence every word classification can have an acceptable bias score associated with it.

The scoring and flagging module 212 can use these values (e.g., unconscious bias severity score 406, statistical dynamic unconscious bias score 512, knowledge graph based unconscious bias score 614, ontology classification 704, and/or acceptable bias threshold 706) to determine a final bias score for the unconscious bias candidate (e.g., score of look up results 708). The scoring and flagging module 212 can then determine whether to generate a flag at 710 for the unconscious bias candidate to create flagged words (with bias scores) 712. Stated another way, the scoring and flagging module can compare the final bias score to a flagging or highlighting threshold and flag the bias candidate when the flagging threshold is exceeded.

Figure 8:
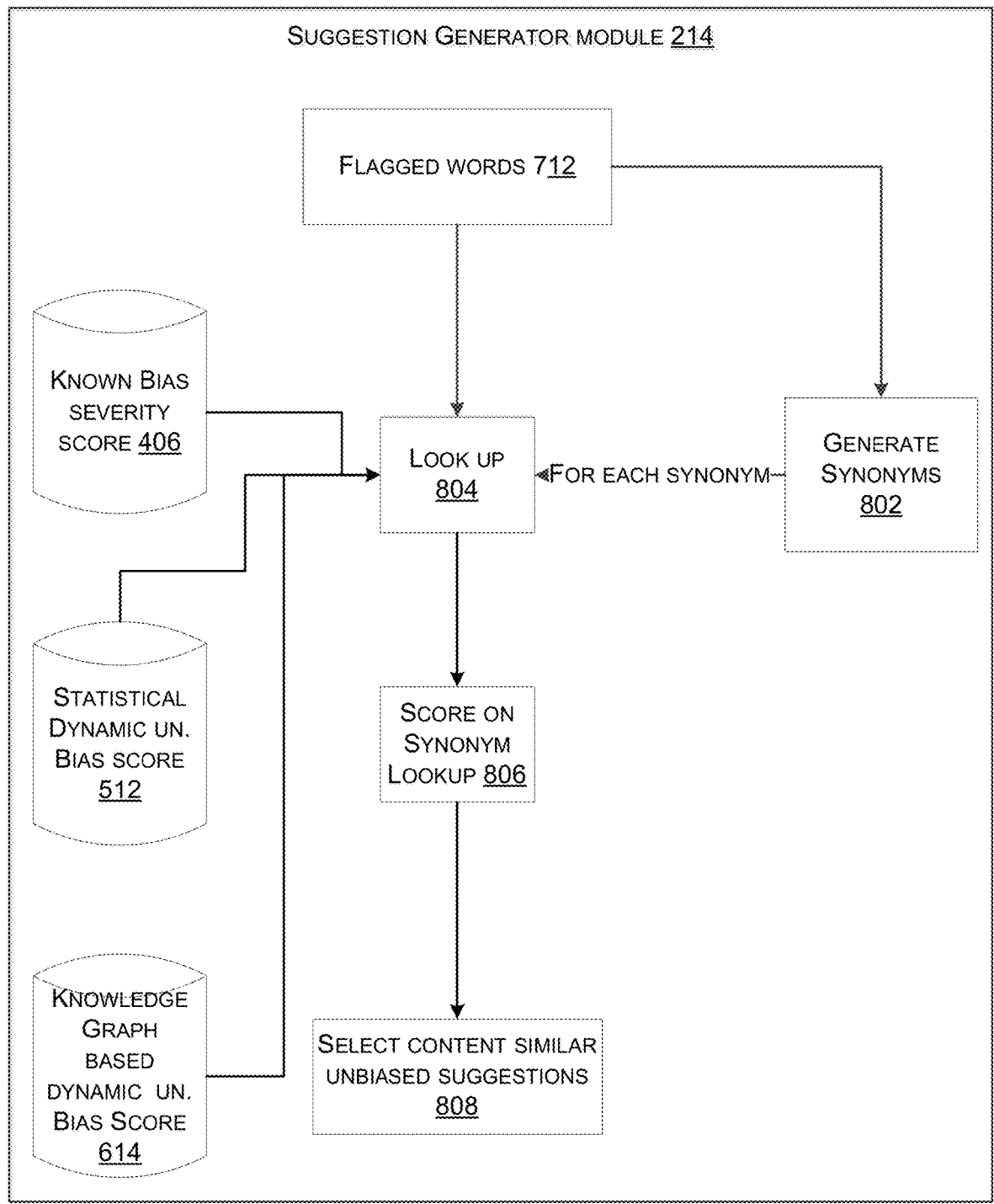

FIG. 8 shows an example suggestion generator module 214. The suggestion generator module can receive flagged words 712 (from FIG. 7) and can generate synonyms at 802. The suggestion generator module 214 can perform a look up at 804 for individual synonyms. The look up can involve the known bias severity score 406, statistical dynamic unconscious bias score 512, and/or knowledge graph based unconscious bias score 614. This procedure can provide synonyms for the context of the flagged word.

The suggestion generator module 214 can score these synonyms (e.g., score on synonym look up at 806). The scoring can provide a mechanism for the suggestion module to compare the original word to the synonyms and pick an individual high scoring synonym (e.g., a synonym with a relatively low bias) to replace the original biased word (e.g., select content similar to unbiased suggestions at 808). Stated another way, some implementations of the suggestion generator module can employ word sense disambiguation to identify suggestions with similar sense and meaning but without the unconscious bias.

Figure 9:
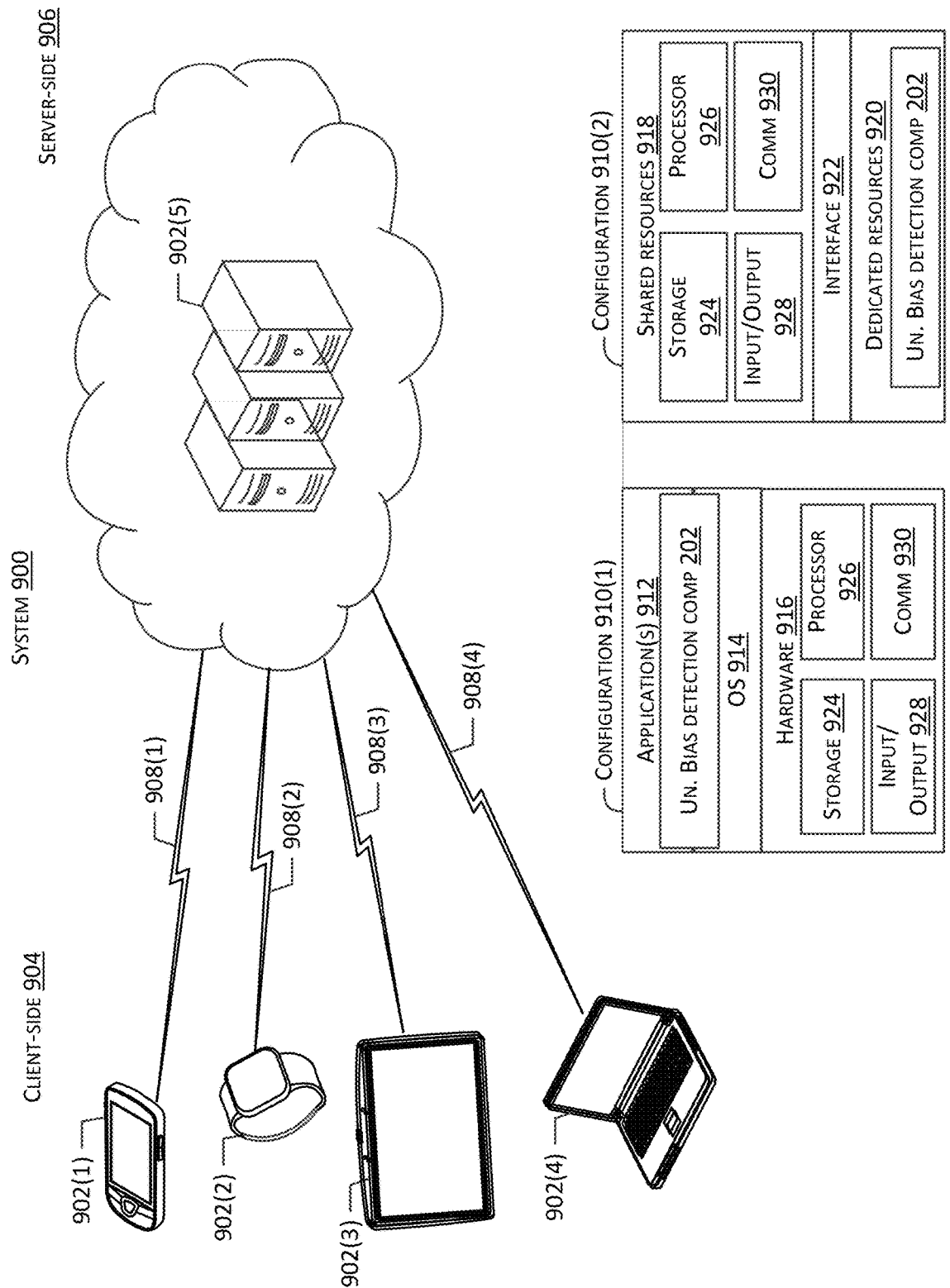

FIG. 9 shows a system 900 that can accomplish unconscious bias detection concepts. For purposes of explanation, system 900 includes devices 902(1), 902(2), 902(3), 902(4), and 902(5). In this example, device 902(1) is manifest as a smartphone device, example device 902(2) is manifest as a wearable smart device, example device 902(3) is manifest as a tablet device, example device 902(4) is manifest as a notebook computer device, and example device 902(5) is manifest as a server device. For purposes of explanation, devices 902(1)-902(4) can be viewed as being positioned on a client or user side 904 and device 902(5) is positioned in remote server-side or cloud-based resources side 906. The number and/or positioning of illustrated devices is intended to be representative and non-limiting. Devices 902 can communicate via one or more networks (represented by lightning bolts 908) and/or can access the Internet over the networks. In some cases, parentheticals are utilized after a reference number to distinguish like elements. Use of the reference number without the associated parenthetical is generic to the element.

FIG. 9 shows two device configurations 910 that can be employed by devices 902. Individual devices 902 can employ either of configurations 910(1) or 910(2), or an alternate configuration. (Due to space constraints on the drawing page, one instance of each configuration is illustrated rather than illustrating the device configurations relative to each device 902). Briefly, device configuration 910(1) represents an operating system (OS) centric configuration. Configuration 910(2) represents a system on a chip (SOC) configuration. Configuration 910(1) is organized into one or more applications 912, operating system 914, and hardware 916. Configuration 910(2) is organized into shared resources 918, dedicated resources 920, and an interface 922 there between.

In either configuration 910, the device can include storage/memory 924, a processor 926, input/output devices 928, a communication component 930, and/or an unconscious bias detection component 202. The unconscious bias detection component can provide an unconscious bias detection service. The unconscious bias detection service can detect unconscious bias in user text and make suggestions, such as on a graphical user interface (GUI) (101, FIG. 1A) presented by the input/output devices 928. Alternatively or additionally, suggestions could be made in other ways, such as via audible instructions rather than visually on a GUI.

In some configurations, each of devices 902 can have an instance of the unconscious bias detection component 202. However, the functionalities that can be performed by individual unconscious bias detection components 202 may be the same or they may be different from one another. For instance, in some cases, each device's unconscious bias detection component can be robust and provide all functionality described above and below (e.g., a device-centric implementation). In other cases, some devices can employ a less robust instance of the unconscious bias detection component that relies on some functionality to be performed remotely (e.g., an app-centric implementation or other implementation that relies on remote (e.g., cloud) processing). Thus, an unconscious bias detection component operating remotely could provide an unconscious bias detection service that is presented locally on the user's device.

In one implementation of configuration 910(1), the unconscious bias detection component 202 can be implemented as a plug-in or extension of application 912. In an alternative scenario, the unconscious bias detection component can be a cloud-based resource (with or without a local app) that the user can leverage to check his/her text for unconscious bias. In still another scenario, the unconscious bias detection component may be local on the device 902, but may access remote resources, such as the known bias wordlist (404 of FIG. 4) and/or linguistic corpus (502 of FIG. 5) to perform unconscious bias detection on the user's text. From another perspective, the unconscious bias detection component, whether local on the device, remote, and/or a combination thereof, can provide the unconscious bias detection service introduced above.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 902 can include traditional computing devices, such as personal computers, desktop computers, servers, notebook computers, cell phones, smart phones, personal digital assistants, pad type computers, mobile computers, cameras, appliances, smart devices, IoT devices, vehicles, etc. and/or any of a myriad of ever-evolving or yet to be developed types of computing devices.

As mentioned above, configuration 910(2) can be thought of as a system on a chip (SOC) type design. In such a case, functionality provided by the device can be integrated on a single SOC or multiple coupled SOCs. One or more processors 926 can be configured to coordinate with shared resources 918, such as memory/storage 924, etc., and/or one or more dedicated resources 920, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 10:
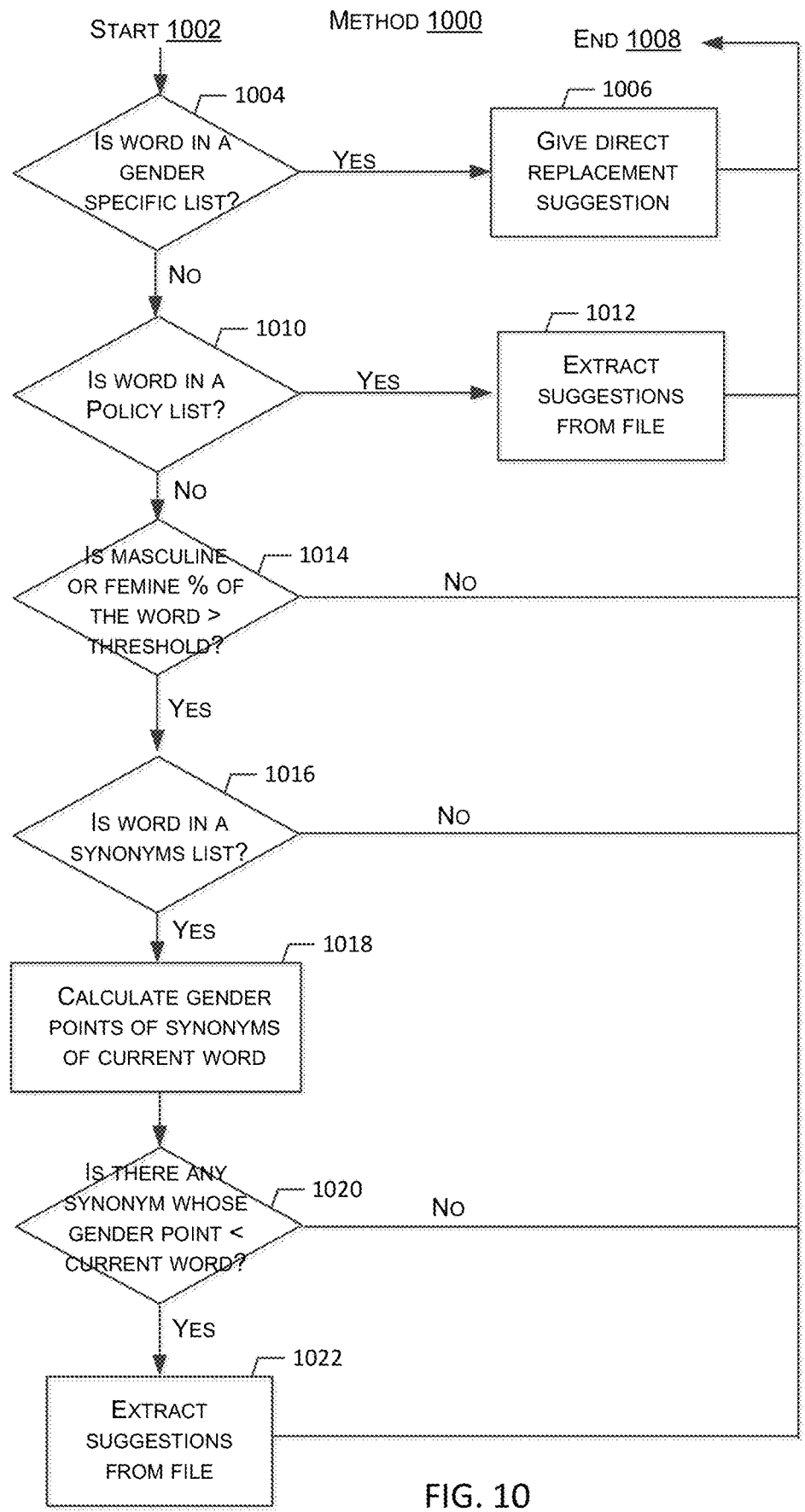
FIGS. 10-14 show example flowcharts relating to unconscious bias detection in accordance with some implementations of the present concepts.

FIG. 10 shows a flowchart of an example unconscious bias detection technique or method 1000.

The method can start at 1002 when user text (e.g., words) is obtained. At block 1004, the method can query whether a word is in a gender specific list. In an instance where the word is in a gender specific list (e.g., 'yes' at 1004), then the method can give a direct replacement suggestion for the word at 1006. The method can then end at 1008. Otherwise, (e.g., 'no' at 1004) the method can query whether the word is in a policy list at 1010. In an instance where the word is in a policy list (e.g., 'yes' at 1010), then the method can extract suggestions from a file at 1012. The method can then end at 1008. Otherwise, (e.g., 'no' at 1010) the method can query whether a masculine or feminine percentage of the word exceeds a threshold at 1014. For example, the threshold could be set at 0.66 in one implementation. If not, (e.g., 'no' at 1014) then the method can end. Otherwise, (e.g., 'yes' at 1014) the method can query whether the word is in a synonyms list at 1016. If not, (e.g., 'no' at 1016) then the method can end. Otherwise, (e.g., 'yes' at 1016) the method can calculate gender points of synonyms of current words at 1018. The method can query whether there are any synonyms whose gender point is less than the current word at 1020. If not, (e.g., 'no' at 1020) then the method can end. Otherwise, (e.g., 'yes' at 1020) the method can extract suggestions from the file at 1022 and then end at 1008.

Figure 11:
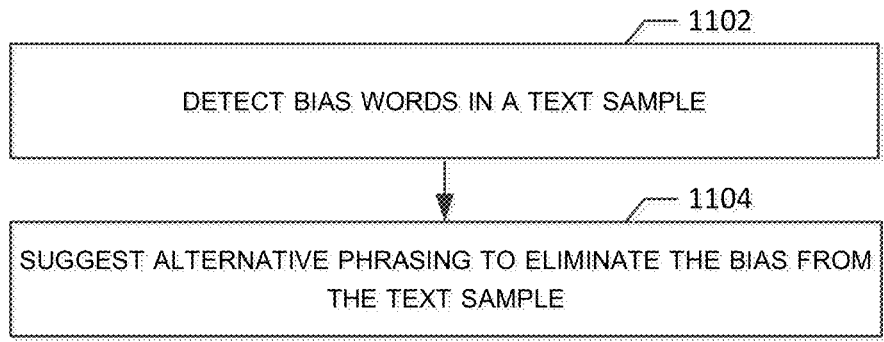

FIG. 11 shows another flowchart of an example unconscious bias detection technique or method 1100.

At block 1102, the method can detect bias words in a text sample.

At block 1104, the method can suggest alternative phrasing to eliminate the bias from the text sample.

Figure 12:
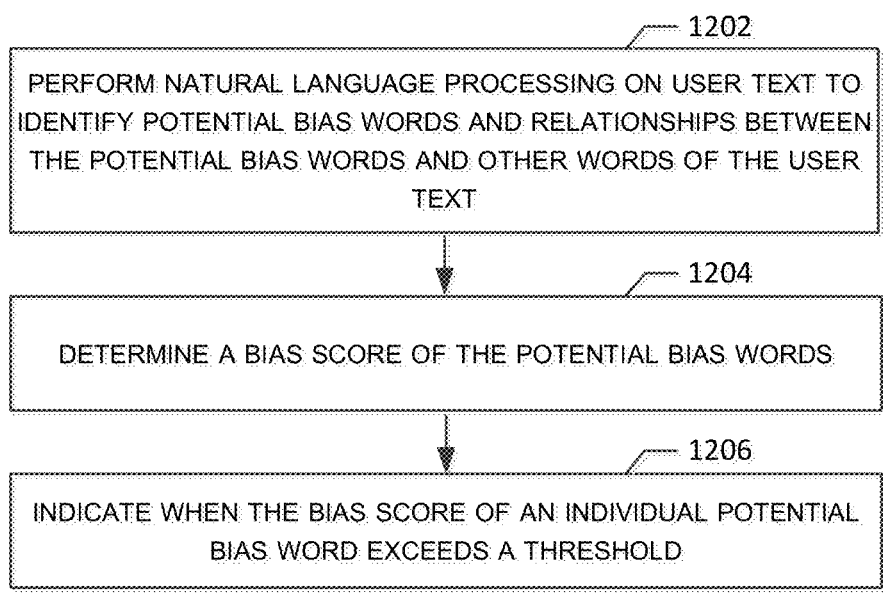

FIG. 12 shows another flowchart of an example unconscious bias detection technique or method 1200.

At block 1202, the method can perform natural language processing on user text to identify potential bias words and relationships between the potential bias words and other words of the user text.

At block 1204, the method can determine a bias score of the potential bias words.

At block 1206, the method can indicate when the bias score of an individual potential bias word exceeds a threshold.

Figure 13:
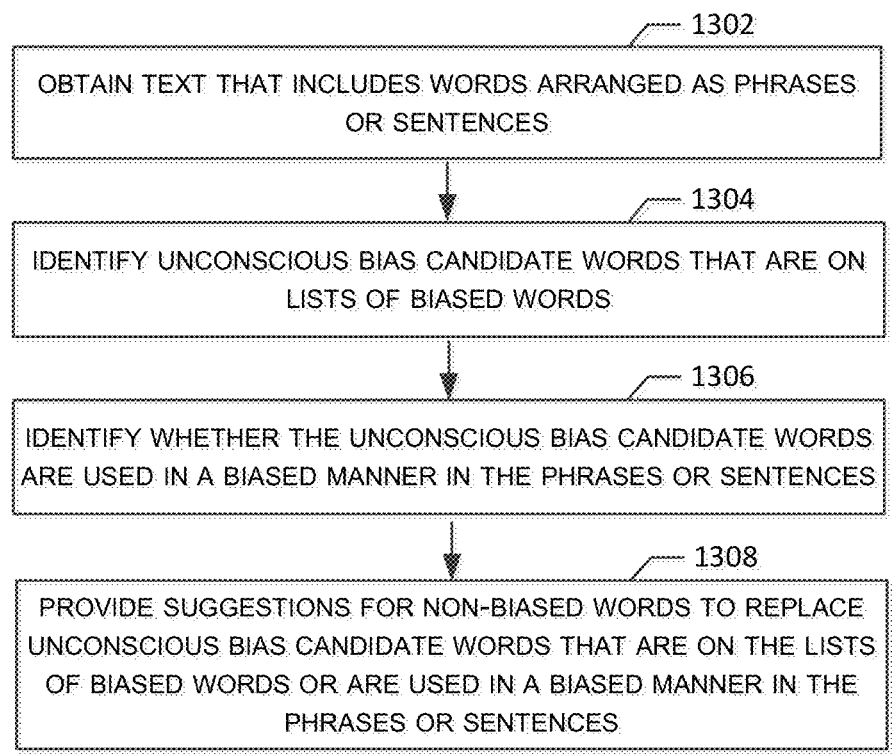

FIG. 13 shows another flowchart of an example unconscious bias detection technique or method 1300.

At block 1302, the method can obtain text that includes words arranged as phrases or sentences.

At block 1304, the method can identify unconscious bias candidate words that are on lists of biased words.

At block 1306, the method can identify whether the unconscious bias candidate words are used in a biased manner in the phrases or sentences.

At block 1308, the method can provide suggestions for non-biased words to replace unconscious bias candidate words that are on the lists of biased words or are used in a biased manner in the phrases or sentences.

Figure 14:
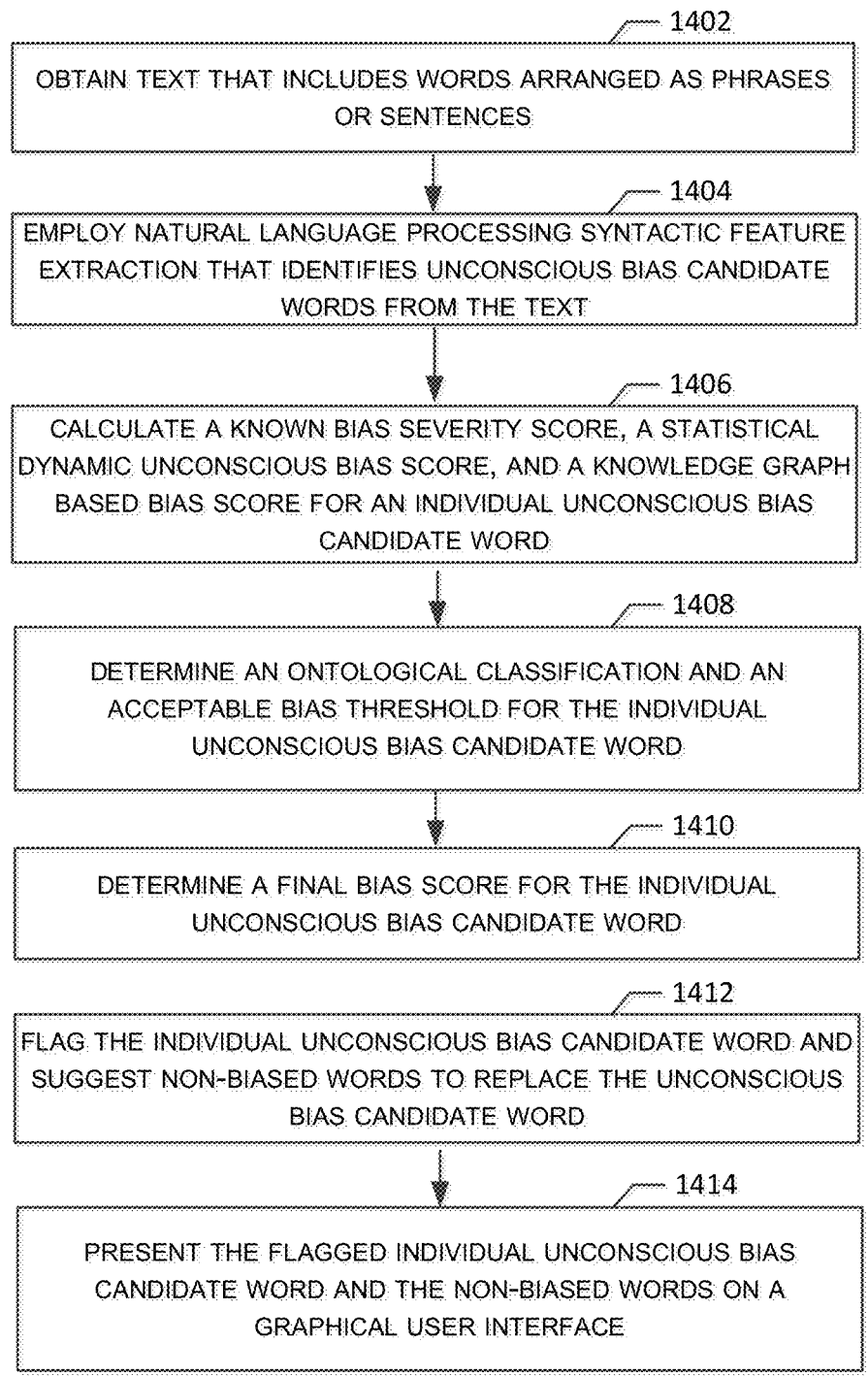

FIG. 14 shows another flowchart of an example unconscious bias detection technique or method 1400.

At block 1402, the method can obtain text that includes words arranged as phrases or sentences. An example text sample is provided below.

> Mr. Peter will be visiting the factory tomorrow. He will be making random checks at all the floors. Manpower working at foundry should be familiar with safety guidelines. Each employee needs to be aware of his surroundings, and needs to always man the machine he is assigned to. After the visit from our chairman, there will be a health checkup for all employees conducted tomorrow. A nurse will be drawing blood samples and taking readings. She will be present in corner room. After that you can choose to visit on duty Doctor. He will be available in middle room. In the evening, employees are advised to accompany their wives for dinner meeting.

At block 1404, the method can employ natural language processing syntactic feature extraction that identifies unconscious bias candidate words from the text. An example is provided below.

1. Mr.$_{\text{``}NNP\text{''}}$ Peter.$_{\text{``}NNP\text{''}}$ will.$_{\text{``}MD\text{''}}$ be.$_{\text{``}VB\text{''}}$ visiting.$_{\text{``}VGB\text{''}}$ the.$_{\text{``}DT\text{''}}$ factory.$_{\text{``}NN\text{''}}$ tomorrow.$_{\text{``}NN\text{''}}$.

2. He.$_{\text{``}PRP\text{''}}$ will.$_{\text{``}MD\text{''}}$ be.$_{\text{``}VB\text{''}}$ making.$_{\text{``}VBG\text{''}}$ random.$_{\text{``}JJ\text{''}}$ checks.$_{\text{``}NNS\text{''}}$ at.$_{\text{``}IN\text{''}}$ all.$_{\text{``}DT\text{''}}$ the.$_{\text{``}DT\text{''}}$ floors.$_{\text{``}NNS\text{''}}$.

3. Manpower."$_{NNP}$" working."$_{VBG}$" at."$_{IN}$" foundry."$_{JJ}$" should."$_{MD}$" be."$_{VB}$" familiar."$_{JJ}$" with."$_{IN}$" safety."$_{NN}$" guidelines."$_{NNS}$".

4. Each."$_{DT}$" employee."$_{NN}$" needs."$_{VBZ}$" to."$_{TO}$" be."$_{VB}$" aware."$_{JJ}$" of."$_{IN}$" his."$_{PRP\$}$" surroundings."$_{NNS}$", and."$_{CC}$" needs."$_{VB}$" to."$_{TO}$" always."$_{RB}$" man."$_{VB}$" the."$_{DT}$" machine."$_{NN}$" he."$_{PRP}$" is."$_{VBZ}$" assigned."$_{VBN}$" to."$_{TO}$".

5. After."$_{NN}$" the."$_{DT}$" visit."$_{NN}$" from."$_{IN}$" our."$_{PRP\$}$" chairman."$_{NN}$", there."$_{EX}$" will."$_{MD}$" be."$_{VB}$" a."$_{DT}$" health."$_{NN}$" checkup."$_{NN}$" for."$_{IN}$" all."$_{DT}$" employees."$_{NN}$" conducted."$_{VBN}$" tomorrow."$_{NN}$".

6. A."$_{DT}$" nurse."$_{NN}$" will."$_{MD}$" be."$_{VB}$" drawing."$_{VBG}$" blood."$_{NN}$" samples."$_{NNS}$" and."$_{CC}$" taking."$_{VBG}$" readings."$_{NNS}$".

7. She."$_{PRP}$" will."$_{MD}$" be."$_{VB}$" present."$_{JJ}$" in."$_{IN}$" corner."$_{NN}$" room."$_{NN}$".

8. After."$_{NN}$" that."$_{IN}$" you."$_{PRP}$" can."$_{MD}$" choose."$_{VB}$" to."$_{TO}$" visit."$_{VB}$" on."$_{IN}$" duty."$_{NN}$" Doctor."$_{NNP}$".

9. He."$_{PRP}$" will."$_{MD}$" be."$_{VB}$" available."$_{JJ}$" in."$_{IN}$" middle."$_{JJ}$" room."$_{NN}$".

10. In."$_{IN}$" the."$_{DT}$" evening."$_{NN}$", employees."$_{NNS}$" are."$_{VBP}$" advised."$_{VBN}$" to."$_{TO}$" accompany."$_{VB}$" their."$_{PRP\$}$" wives."$_{NNS}$" for."$_{IN}$" dinner."$_{NN}$" meeting."$_{VBP}$".

At block 1406, the method can calculate a known unconscious bias severity score, a statistical dynamic unconscious bias score, and a knowledge graph based unconscious bias score for an individual unconscious bias candidate word. First, the method can remove or filter stop words and unbiased POS Stages and remove reference for proper nouns with correctly referenced pronouns.

1. visiting."$_{VBG}$" factory."$_{NN}$" tomorrow."$_{NN}$".
2. be."$_{VB}$" making."$_{VBG}$" random."$_{JJ}$" checks."$_{NNS}$" floors."$_{NNS}$"
3. Manpower."$_{NNP}$" working."$_{VBG}$" foundry."$_{JJ}$" familiar."$_{JJ}$" safety."$_{NN}$" guidelines."$_{NNS}$"
4. employee."$_{NN}$" needs."$_{VBZ}$" aware."$_{JJ}$" his."$_{PRP\$}$" surroundings."$_{NNS}$" needs."$_{VB}$" always."$_{RB}$" man."$_{VB}$" machine."$_{NN}$" he."$_{PRP}$" assigned."$_{VBN}$"
5. After."$_{NN}$" visit."$_{NN}$" our."$_{PRP\$}$" chairman."$_{NN}$" be."$_{VB}$" health."$_{NN}$" checkup."$_{NN}$" employees."$_{NN}$" conducted."$_{VBN}$" tomorrow."$_{NN}$"
6. nurse."$_{NN}$" drawing."$_{VBG}$" blood."$_{NN}$" samples."$_{NNS}$" taking."$_{VBG}$" readings."$_{NNS}$"
7. She."$_{PRP}$" be."$_{VB}$" present."$_{JJ}$" corner."$_{NN}$" room."$_{NN}$"
8. After."$_{NN}$" you."$_{PRP}$" choose."$_{VB}$" visit."$_{VB}$" duty."$_{NN}$" Doctor."$_{NNP}$"
9. He."$_{PRP}$" be."$_{VB}$" available."$_{JJ}$" middle."$_{JJ}$" room."$_{NN}$"
10. evening."$_{NN}$" employees."$_{NNS}$" are."$_{VBP}$" advised."$_{VBN}$" accompany."$_{VB}$" their."$_{PRP\$}$" wives."$_{NNS}$" dinner."$_{NN}$" meeting."$_{VBP}$"

Next, the method can determine stems for the text.

1. visit."$_{VBG}$" factory."$_{NN}$" tomorrow."$_{NN}$"
2. be."$_{VB}$" make."$_{VBG}$" random."$_{JJ}$" check."$_{NNS}$" floor."$_{NNS}$"
3. Manpower."$_{NNP}$" work."$_{VBG}$" foundry."$_{JJ}$" familiar."$_{JJ}$" safety."$_{NN}$" guideline."$_{NNS}$"
4. employee."$_{NN}$" need."$_{VBZ}$" aware."$_{JJ}$" his."$_{PRP\$}$" surrounding."$_{NNS}$" needs."$_{VB}$" alway."$_{RB}$" man."$_{VB}$" machine."$_{NN}$" he."$_{PRP}$" assigned."$_{VBN}$"
5. After."$_{NN}$" visit."$_{NN}$" our."$_{PRP\$}$" chairman."$_{NN}$" be."$_{VB}$" health."$_{NN}$" checkup."$_{NN}$" employees."$_{NN}$" conducted."$_{VBN}$" tomorrow."$_{NN}$"
6. nurse."$_{NN}$" draw."$_{VBG}$" blood."$_{NN}$" sample."$_{NNS}$" take."$_{VBG}$" reading."$_{NNS}$"
7. She."$_{PRP}$" be."$_{VB}$" present."$_{JJ}$" corner."$_{NN}$" room."$_{NN}$"
8. After."$_{NN}$" you."$_{PRP}$" choose."$_{VB}$" duty."$_{NN}$" Doctor."$_{NNP}$"
9. He."$_{PRP}$" be."$_{VB}$" available."$_{JJ}$" middle."$_{JJ}$" room."$_{NN}$"
10. evening."$_{NN}$" employees."$_{NNS}$" are."$_{VBP}$" advised."$_{VBN}$" accompany."$_{VB}$" their."$_{PRP\$}$" wives."$_{NNS}$" dinner."$_{NN}$" meeting."$_{VBP}$"

The method can then provide a listing of bias candidates.

1. visit."$_{VBG}$" factory."$_{NN}$" tomorrow."$_{NN}$"
2. be."$_{VB}$" make."$_{VBG}$" random."$_{JJ}$" check."$_{NNS}$" floor."$_{NNS}$"
3. Manpower."$_{NNP}$" work."$_{VBG}$" foundry."$_{JJ}$" familiar."$_{JJ}$" safety."$_{NN}$" guideline."$_{NNS}$"
4. employee."$_{NN}$" need."$_{VBZ}$" aware."$_{JJ}$" his."$_{PRP\$}$" surrounding."$_{NNS}$" needs."$_{VB}$" alway."$_{RB}$" man."$_{VB}$" machine."$_{NN}$" he."$_{PRP}$" assigned."$_{VBN}$"
5. After."$_{NN}$" visit."$_{NN}$" our."$_{PRP\$}$" chairman."$_{NN}$" be."$_{VB}$" health."$_{NN}$" checkup."$_{NN}$" employees."$_{NN}$" conducted."$_{VBN}$" tomorrow."$_{NN}$"
6. nurse."$_{NN}$" draw."$_{VBG}$" blood."$_{NN}$" sample."$_{NNS}$" take."$_{VBG}$" reading."$_{NNS}$"
7. She."$_{PRP}$" be."$_{VB}$" present."$_{JJ}$" corner."$_{NN}$" room."$_{NN}$"
8. After."$_{NN}$" you."$_{PRP}$" choose."$_{VB}$" visit."$_{VB}$" duty."$_{NN}$" Doctor."$_{NNP}$"
9. He."$_{PRP}$" be."$_{VB}$" available."$_{JJ}$" middle."$_{JJ}$" room."$_{NN}$"
10. evening."$_{NN}$" employees."$_{NNS}$" are."$_{VBP}$" advised."$_{VBN}$" accompany."$_{VB}$" their."$_{PRP\$}$" wives."$_{NNS}$" dinner."$_{NN}$" meeting."$_{VBP}$"

At block 1408, the method can determine an ontological classification and an acceptable bias threshold for the individual unconscious bias candidate word. In the present example, this act can entail removing words from a biased classification with higher bias threshold:

Remove: factory"NN"(0.82), foundry"JJ" (0.72), machine"NN"(0.81)

These words belong to biased classification and hence their bias threshold is (0.1, 0.9). As such, these words are removed as unbaised.

At block 1410, the method can determine a final bias score for the individual unconscious bias candidate word based at least in part on the known bias severity score, the statistical dynamic unconscious bias score, the knowledge graph based unconscious bias score, ontological classification, and the acceptable bias threshold.

3: Manpower."$_{NNP}$"(0.79)=>crew."$_{NNP}$"(0.57), workforce."$_{NNP}$"(0.59), personnel."$_{NNP}$"(0.55)

4: his."$_{PRP\$}$" (1)=>Rephrase with gender neutral usage' man."$_{VB(0.92)}$"=>run."$_{VB}$" (0.53), operate."$_{VB}$" (0.56), occupy."$_{VB}$" (0.57) he."$_{PRP}$" (1)=>Rephrase with gender neutral usage 5: chairman."$_{NN}$"(0.76)=>chairperson."$_{NN}$"(0.61) chair."$_{NN}$"(0.63), convener."$_{NN}$"(0.63)

7: She."$_{PRP}$"(1)=>Rephrase with gender neutral usage

9: He."$_{PRP}$"(1)=>Rephrase with gender neutral usage

10: wife."$_{NNS}$"(0.18)=>spouse."$_{NNS}$"(0.53), life partner."$_{NNS}$"(0.52), partner."$_{NNS}$"(0.55), better half."$_{NNS}$" (0.54)

The acceptable bias threshold can entail considering words with bias scores above and below a threshold (0.66, 0.33). Thus, the bias threshold is (<0.33 or >0.66).

At block 1412, in an instance when the final bias score exceeds a flagging threshold, the method can flag the individual unconscious bias candidate word and suggest nonbiased words to replace the unconscious bias candidate word. In the example provided below relative to block 1414, the flagged words are shown in bold.

At block 1414, the method can present the flagged individual unconscious bias candidate word and the non-biased words on a graphical user interface. An example text sample is provided below.

Mr. Peter will be visiting the factory tomorrow. He will be making random checks at all the floors. Manpower (suggested replacement, "Workforce") working at foundry should be familiar with safety guidelines. Each employee needs to be aware of his (replace with gender neutral pronoun) surroundings, and needs to always man (suggested replacement, "occupy") the machine he (replace with gender neutral pronoun) is assigned to. After the visit from our chairman (suggested replacement, "chairperson"), there will be a health checkup for all employees conducted tomorrow. A nurse will be drawing blood samples and taking readings. She (replace with gender neutral pronoun) will be present in corner room. After that you can choose to visit on duty Doctor. He (replace with gender neutral pronoun) will be available in middle room. In the evening, employees are advised to accompany their wives (suggested replacement, "partner") for dinner meeting.

Thus, the method can find unbiased/less biased synonyms based on word sense disambiguation. Stated another way, unconscious bias detection can provide a service that can read text, detect any implied unconscious bias present, and/or make suggestions to fix the detected unconscious bias. From one perspective, the present concepts can detect potential biased-language terms/phrases/sentences and highlight them for the user. Alternative suggestions can be provided to the user and if the user desires, an explanation can be provided to the user.

The described methods can be performed by the systems and/or elements described above and/or below, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, and/or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Although the subject matter relating to unconscious bias detection has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various device examples are described above. Additional examples are described below. One example includes a system comprising storage storing computer-executable instructions for: obtaining text that includes words arranged as phrases or sentences, employing natural language processing syntactic feature extraction that identifies unconscious bias candidate words from the text, calculating a known bias severity score, a statistical dynamic bias score, and a knowledge graph based bias score for an individual unconscious bias candidate word. The computer-executable instructions further determine an ontological classification and an acceptable bias threshold for the individual unconscious bias candidate word, and determine a final bias score for the individual unconscious bias candidate word based at least in part on the known bias severity score. The computer-executable instructions further determine the statistical dynamic unconsious bias score, the knowledge graph based unconsious bias score, ontological classification, and the acceptable bias threshold. In an instance when the final bias exceeds a flagging threshold, the computer-executable instructions flag the individual unconscious bias candidate word and suggest non-biased words to replace the unconscious bias candidate word. The computer-executable instructions also present the flagged individual unconscious bias candidate word and the non-biased words on a graphical user interface. The system further includes a processing device that executes the computer-executable instructions.

Another example can include any of the above and/or below examples where the system is embodied on a user device.

Another example can include any of the above and/or below examples where the system is embodied on cloud-based resources.

Another example can include at least one computer-readable storage medium having instructions stored thereon that, when executed by a computing device, cause the computing device to perform acts comprising: performing natural language processing on user text to identify potential bias words and relationships between the potential bias words and other words of the user text, determining a bias score of the potential bias words, and indicating when the bias score of an individual potential bias word exceeds a threshold.

Another example can include any of the above and/or below examples where the determining comprises comparing the potential bias words to lists of bias words.

Another example can include any of the above and/or below examples where the indicating comprises indicating visually.

Another example can include any of the above and/or below examples where the indicating visually comprises highlighting the individual potential bias word.

Another example can include any of the above and/or below examples where the highlighting comprises bolding the individual potential bias word or underlining the individual potential bias word.

Another example can include any of the above and/or below examples where the indicating comprises providing alternative suggestions to a user that generated the user text.

Another example can include any of the above and/or below examples where the indicating comprises providing an explanation to a user that generated the user text.

Another example can include any of the above and/or below examples where the indicating comprises highlighting an individual potential bias word, providing an explanation about the individual potential bias words, and providing alternative suggestions to a user that generated the user text.

Another example can include any of the above and/or below examples where the determining the bias score comprises comparing the individual potential bias word to a static listing of known bias words and a dynamic listing of known bias words.

Another example can include any of the above and/or below examples where the performing natural language processing distinguishes a non-biased use of an individual potential bias word from a biased use of the individual potential bias word based upon the relationships with the other words.

Another example can include any of the above and/or below examples where determining the bias score comprises evaluating individual potential bias words and associated part of speech tags with a known bias severity score, a statistical dynamic unconscious bias score, and/or a knowledge graph based unconscious bias score.

Another example can include any of the above and/or below examples where the at least one computer-readable storage medium further comprises determining an ontology classification for the individual potential bias words.

Another example can include any of the above and/or below examples where the at least one computer-readable storage medium further comprises determining final bias scores for the individual potential bias words based at least in part upon the ontology classification, the known bias severity score, the statistical dynamic unconsious bias score, and/or the knowledge graph based unconscious bias score.

Another example can include a method comprising detecting bias words in a text sample and suggesting alternative phrasing to eliminate the bias words from the text sample.

Another example can include any of the above and/or below examples where the detecting bias words comprises evaluating words of the text sample and contexts of the words.

Another example can include any of the above and/or below examples where the evaluating comprises generating bias scores for the words and wherein the bias words have bias scores above a threshold.

Another example can include any of the above and/or below examples where the detecting comprises determining parts of speech of words of the text sample and a relationship of the words to other words in the text sample.

Another example can include storage storing computer-executable instructions for: obtaining text that includes words arranged as phrases or sentences, identifying unconscious bias candidate words that are on lists of biased words, identifying whether the unconscious bias candidate words are used in a biased manner in the phrases or sentences, and providing suggestions for non-biased words to replace unconscious bias candidate words that are on the lists of biased words or are used in a biased manner in the phrases or sentences. The storage further includes a processing device that executes the computer-executable instructions.

Another example can include any of the above and/or below examples where the system is embodied on a user device.

Another example can include any of the above and/or below examples where the system is embodied on cloud-based resources.

The invention claimed is:

1. A system, comprising:
   storage storing computer-executable instructions for:
      obtaining text that includes words arranged as phrases or sentences;
      identifying unconscious bias candidate words from the text by determining that a gender-specific pro-form does not have a corresponding expression in the text that the gender-specific pro-form refers to;
      selecting a bias score for an individual unconscious bias candidate word from a table of known bias words and associated bias severities for the known bias words;
      determining a particular class from an ontological classification that the individual unconscious bias candidate word belongs to, the ontological classification including a plurality of classes and acceptable bias thresholds associated with the plurality of classes;
      determining a particular acceptable bias threshold associated with the determined particular class to which the individual unconscious bias candidate word belongs;
      in an instance when the bias score exceeds a flagging threshold and also exceeds the particular acceptable bias threshold, flagging the individual unconscious bias candidate word and suggesting one or more non-biased words that are gender-neutral to replace the individual unconscious bias candidate word; and
      presenting the flagged individual unconscious bias candidate word and the one or more non-biased words on a graphical user interface by displaying, in a first subset of the graphical user interface, a portion of the text containing the flagged individual unconscious bias candidate word and highlighting the flagged individual unconscious bias candidate word, and further displaying, in a second subset of the graphical user interface, a listing of suggested alternative language choices using the one or more non-biased words in association with the flagged individual unconscious bias candidate word, wherein selection of one of the suggested alternative language choices automatically replaces the flagged individual unconscious bias candidate word in the text; and,
   a processor that executes the computer-executable instructions.

2. The system of claim 1, embodied on a user device.

3. The system of claim 1, embodied on cloud-based resources.

4. The system of claim 1, wherein highlighting the flagged individual unconscious bias candidate word includes bolding the flagged individual unconscious bias candidate word.

5. The system of claim 1, wherein highlighting the flagged individual unconscious bias candidate word includes underlining the flagged individual unconscious bias candidate word.

6. The system of claim 1, wherein the listing of suggested alternative language choices is displayed in association with the flagged individual unconscious bias candidate word by being displayed in proximity to the flagged individual unconscious bias candidate word.

7. At least one computer-readable storage medium having instructions stored thereon that, when executed by a processor of a computing device, cause the computing device to perform acts, comprising:
   identifying a potential bias word that indicates a gender bias and relationships between the potential bias word and other words of user text based at least in part on determining that the potential bias word is a gender-specific pro-form that does not correspond to an expression in the other words of the user text that the gender-specific pro-form refers to;
   determining a bias score of the potential bias word by accessing a listing of bias words and associated bias scores;
   determining a particular class and a particular acceptable bias threshold from an ontological classification that the potential bias word belongs to, the ontological classification including a plurality of classes and acceptable bias thresholds associated with the plurality of classes;
   indicating when the bias score of the potential bias word exceeds the particular acceptable bias threshold by displaying, on a first subset portion of a graphical user interface, the potential bias word being highlighted and further displaying, on a second subset portion of the graphical user interface, a non-biased word alternative in association with the potential bias word, the non-biased word alternative being a gender-neutral word alternative; and
   replacing the potential bias word with the non-biased word alternative in the user text upon receiving a selection of the displayed non-biased word alternative via the graphical user interface of the computing device.

8. The at least one computer-readable storage medium of claim 7, wherein the determining the bias score comprises comparing the potential bias word to the listing of bias words.

9. The at least one computer-readable storage medium of claim 7, wherein the highlighting comprises bolding or underlining the potential bias word in the first subset portion of the graphical user interface.

10. The at least one computer-readable storage medium of claim 7, wherein the indicating comprises providing the non-biased word alternative to a user that generated the user text.

11. The at least one computer-readable storage medium of claim 7, wherein the indicating comprises providing an explanation to a user that generated the user text in a third subset portion of the graphical user interface.

12. The at least one computer-readable storage medium of claim 7, wherein the indicating comprises providing an explanation about the potential bias word in a third subset portion of the graphical user interface, and providing the non-biased word alternative to a user that generated the user text in the second subset portion of the graphical user interface.

13. The at least one computer-readable storage medium of claim 7, wherein the determining the bias score comprises comparing the potential bias word to a static listing of known bias words and a dynamic listing of known bias words.

14. The at least one computer-readable storage medium of claim 7, wherein the acts further comprise:
removing one or more stop words from the user text; or
stemming the potential bias word.

15. The at least one computer-readable storage medium of claim 7, wherein the acts further comprise:
using a natural language processing module to extract syntactic features from the user text,
wherein the syntactic features include parts of speech and/or co-references.

16. A method, comprising:
identifying a gender-specific pro-form that does not have a corresponding expression in a text sample that the gender-specific pro-form refers to;
determining a bias score for the gender-specific pro-form, the bias score indicating a severity of bias;
determining a particular class from an ontological classification that the gender-specific pro-form belongs to, the ontological classification including a plurality of classes and bias thresholds associated with the plurality of classes;
flagging the gender-specific pro-form as an unconscious bias word in response to determining that the bias score for the gender-specific pro-form exceeds a particular bias threshold associated with the particular class to which the gender-specific pro-form belongs;
displaying a graphical user interface having first and second subset portions, the first subset portion displaying the unconscious bias word highlighted, and the second subset portion displaying a listing of suggested alternative phrasing to eliminate the unconscious bias word from the text sample, the listing of suggested alternative phrasing being displayed in association with the unconscious bias word, wherein the alternative phrasing is a gender-neutral phrasing that can be selected via the graphical user interface; and
replacing the unconscious bias word with the alternative phrasing in the text sample upon receiving a selection of the alternative phrasing via the graphical user interface.

17. The method of claim 16, wherein identifying the gender-specific pro-form comprises evaluating words of the text sample and contexts of the unconscious bias word.

18. The method of claim 17, wherein the bias score for the gender-specific pro-form is determined based at least on the evaluating.

19. The method of claim 16, further comprising:
looking up synonyms of the unconscious bias word to generate the listing of suggested alternative phrasing.

20. The method of claim 19, further comprising:
scoring the synonyms based at least on similarity in meaning of the synonyms to the unconscious bias word and/or bias severities associated with the synonyms.

* * * * *